Feb. 26, 1963 R. E. MOREY 3,079,468

MAGNETIC RECORDING AND REPRODUCING

Filed Dec. 24, 1958 2 Sheets-Sheet 1

INVENTOR.
ROBERT E. MOREY
BY Morris A. Rabkin
ATTORNEY

Feb. 26, 1963 R. E. MOREY 3,079,468

MAGNETIC RECORDING AND REPRODUCING

Filed Dec. 24, 1958 2 Sheets-Sheet 2

INVENTOR.
ROBERT E. MOREY

BY Morris B. Rabkin

ATTORNEY

United States Patent Office 3,079,468 Patented Feb. 26, 1963

3,079,468

MAGNETIC RECORDING AND REPRODUCING

Robert E. Morey, Hamilton Square, N.J., assignor to Radio Corporation of America, a corporation of Delaware Filed Dec. 24, 1958, Ser. No. 782,827
18 Claims. (Cl. 179—100.2)

The present invention relates to magnetic recording and reproducing, and more particularly to improved transducers of the type generally known as magnetic heads for scanning magnetic records.

The invention is especially concerned with magnetic heads having virtual signal gaps. Such magnetic heads are disclosed and claimed in an application filed concurrently with the present application in the name of Edward Coley Fox, Serial No. 782,826. The Fox application discloses a magnetic head having a core of magnetic material. The core has a constriction in the region thereof adapted to be disposed adjacent a magnetic record to be scanned. A virtual or effective signal gap is obtained in the constricted core region which is in a magnetically saturated state.

Conventional magnetic head constructions include physical signal gaps. Much attention must be paid to the design of these physical signal gaps. The signal gap is considered to the primarily responsible for the operating characteristics of the head, since it defines the recording flux field and establishes the entrance for previously, magnetically recorded signal flux into the magnetic head during playback. Accordingly, good magnetic heads require precision signal gaps. Consequently, these heads are difficult and expensive to manufacture.

The operating characteristics of presently known magnetic heads tend to become degraded after a period of use. Wear, clogging of the gap by material cast off by the magnetic record, and rough handling are believed responsible for the deterioation in head characteristics.

It is a primary object of the present invention to provide an improved magnetic head wherein a physical gap is not needed.

It is a further object of the present invention to provide an improved magnetic head having a virtual signal gap.

It is a still further object of the present invention to provide an improved magnetic head having operating characteristics which do not deteriorate with use or handling.

It is a still further object of the present invention to provide an improved magnetic head the characteristics of which can be varied readily as required by changing conditions of use.

It is a still further object of the present invention to provide an improved magnetic head having a precisely defined virtual signal gap.

It is a still further object of the present invention to provide an improved magnetic head having a controllable virtual signal gap.

In accordance with the present invention, one form of mangetic head, briefly described, includes a core of magnetic material, which desirably is a ferrite. A signal coil is wound around this core and provides electrical signals corresponding to signals magnetically recorded an a magnetic record scanned by the core. Alternatively, signals to be recorded may be applied to the coil to establish magnetic flux within the core corresponding to the signals to be recorded. A current carrying element, such as an electrical conductor, is disposed transversely across the core in a region thereof adjacent the magnetic record. This element establishes a magnetic field to saturate the core in the region adjacent the magnetic record and to thus provide a virtual signal gap at this region, that is, a gap which is not a physical gap, but which effectively acts as such as gap. The virtual gap provided in this manner may be controlled in shape in accordance with the current through the aforementioned current carrying element and the configuration thereof. The magnetic flux within the core due to the recording signals applied to the coil therefore establishes a recording field at the record without the need for physical discontinuity in the core. Similarly, the virtual gap presents a means for entrance of signal flux on the magnetic record into the core when the head is used for reproduction of the signals already recorded on the record.

The invention itself, both as to its organization and method of operation, as well as the foregoing and other objects and advantages thereof, will become more readily apparent from a reading of the following description in connection with the accompanying drawings in which.

Figure 1:
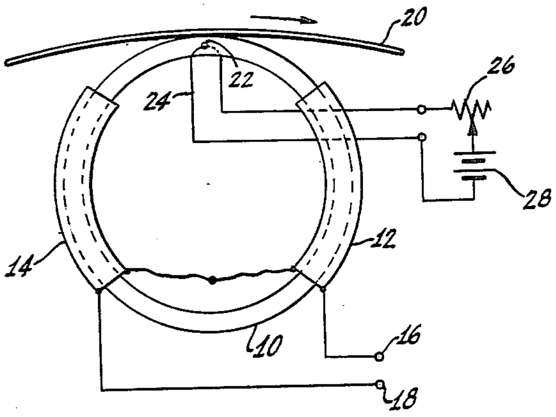
FIGURE 1 is a front view diagrammatically showing one form of magnetic head in accordance with the present invention.

Referring, now, more particularly to FIGURE 1 of the drawings, there is shown a magnetic head having a ring core 10 of magnetic material. Other core configurations may be used where desirable. A suitable magnetic material for the core 10 may be a ferrite, such as a manganese-zinc ferrite. A pair of coils 12 and 14 are wound around the core 10. These coils 12 and 14 may each contain as many as one hundred turns of wire. The coils 12 and 14 are connected together in hum bucking relationship between a pair of terminal 16 and 18. Signals may be derived across the terminals 16 and 18 when the head is operative to play back signals previously recorded on a tape 20. Signals to be recorded may be applied to the terminals 16 and 18 and will be recorded on the tape 20 in the manner presently to be described.

The core 10 has a small aperture 22 therein adjacent to the outer surface thereof which is adapted to engage the tape 20. This aperture preferably has its axis parallel to the axis of the ring core 10. Extending through the aperture 22 is a current carrying element, such as the wire conductor 24. Since the aperture axis is parallel to the axis of the core, the current path along the portion of the conductor 24 within the aperture 22 will also be parallel to the axis of the core. As will be brought out hereinafter, the shape of the current path determines the shape of the virtual gap provided in the core. Accordingly, it may be desirable, when special patterns of recorded signal must be recorded or played back from the tape 20, to provide different configurations of the conductor 24 and aperture 22. These configurations may be readily achieved by drilling through the core with a fine drill. An ultrasonic drill may be suitable for this purpose. Alternatively, if ferrite material is used for the core 10, the conductor 24 may be molded with the ferrite powder when the core 10 is being formed. The conductor may be held taut, thereby providing a straight virtual gap rather than a relatively ragged gap ordinarily obtained in conventional magnetic heads.

The conductor 24 is connected in series with a rheostat 26 and a source of direct current illustrated as a battery 28. The position of the arm of the rheostat determines the magnitude of the current passing through the conductor 24.

In operation, direct current from the battery 28 passes through the conductor 24 and establishes a direct current magnetic field in the region of the core adjacent to the magnetic record tape 20. The magnetic field around the conductor 24 is circular. Accordingly, the concentration of flux lines is restricted to the region of the core adjacent to the magnetic tape 20. The current is increased, say, for example, to a value of between 1 and 2 amperes for a large core approximately 1/4 inch thick. The flux density in the core around the conductor 24 accordingly increases until a small region of the core adjacent to the conductor is placed in a state of magnetic saturation. The saturated region of the core consequently has a magnetic permeability approximately equal to 1 which is approximately the permeability of an actual physical gap. Accordingly, at this saturated region, where no physical gap actually exists in the core 10, a virtual gap is established adjacent to the magnetic record. The magnetic field around the conductor, however, has been found not to extend outside the core. Further increases in current applied to the conductor will cause saturation of the entire core before any appreciable flux emanates and fringes into the air so as to establish a field adjacent to the tape. Since, at most, a negligible external field adjacent to the tape is formed due to the current passing through the conductor, the signals recorded on the tape will not be erased or in any way deteriorated.

Signals to be recorded are applied across the terminals 16 and 18 together with either alternating or direct current bias, as desired. These signals establish a magnetic flux within the core which fringes at the virtual gap to establish a recording field for recording the signals on the tape 20. On playback, the signal flux recorded on the tape enters the core around the virtual gap and produces, in the coils 12 and 14, electrical signals which appear across the terminals 16 and 18. The signals may be amplified in known manner. The amplifiers for recording and playback may be provided with conventional frequency response characteristics to equalize and/or compensate for the frequency response characteristics of the magnetic head.

It will be observed that the virtual gap is dependent in size and shape upon the amount of current transmitted through the conductor 24. Accordingly, it is a feature of the invention to alter the character of the gap by changing the current flow therethrough. This may be desirable after a period of wear of the head. Magnetic heads are subject to considerable wear since the coating on the magnetic tape is of an abrasive character. Thus, the current passing through the conductor 24 may be decreased to maintain the size of the gap regardless of head wear.

Another feature of the head is its sturdy construction which resists rough handling by reason of the fact that only a single core is used. Precise core support means are also unnecessary because of this core construction.

The core region which is driven to a state of magnetic saturation to define a virtual gap is shaped in accordance with the configuration of the conductor. Accordingly a suitable straight virtual gap is obtained by maintaining the conductor taut or confined in an acurately drilled aperture, as aforementioned.

Figure 2:
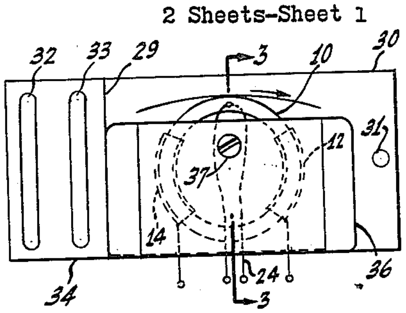
FIGURE 2 is a front view of the head of FIGURE 1 shown suitably supported for mounting in a magnetic recording and reproducing machine.
Figure 3:
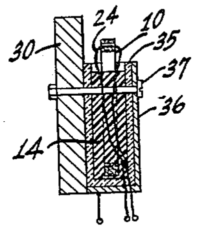
FIGURE 3 is a cross-sectional view taken along the line 3—3 of FIGURE 2.

FIGURES 2 and 3 show a magnetic head and supporting structure therefor according to the present invention, using a head of the type shown in FIGURE 1. A mounting member 30 which may be of some non-magnetic material, such as aluminum, carries the magnetic head. This mounting member has a hole 31 therethrough adjacent one side thereof, and a pair of parallel slots 32 and 33 therethrough adjacent the other side thereof. The region 34 of the member 30 having the slots 32 and 33 therein may be offset from the region adjacent thereto to provide a shoulder 29. The mounting member may be placed on the panel or deck of a magnetic recorder and supported by screws passing through the slots 32 and 33 and the hole 31. The mounting therefore provides means for pivoting the magnetic head to permit adjustment of the azimuth position of the virtual signal gap therein. The core 10 and the coils 12 and 14 thereon are disposed within an open container 35 of some non-magnetic material such as a plastic. This container may be filled with casting plastic to positively secure the core in place therein. The container 35 is held against the mounting member 30 alongside the shoulder 29 by means of a shield member 36 of some conductive material, such as copper. The container 35 and shield 36 thereon are held in position against the mounting member 30 by means of a nut and bolt 37. The simplicity and low cost of this mounting arrangement will be apparent. It will be obvious that the magnetic head described above is much more readily manufacturable and of lower cost than conventional magnetic head having physical gaps.

Figure 4:
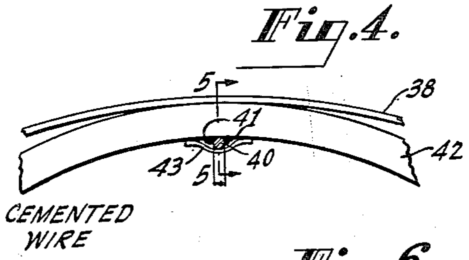
FIGURE 4 is a fragmentary front view of a magnetic head constructed in accordance with another embodiment of the invention.
Figure 5:
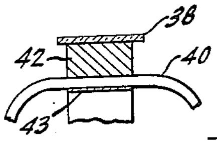
FIGURE 5 is a cross-sectional view taken along the line 5—5 of FIGURE 4.

FIGURES 4 and 5 are fragmentary views of a different form of magnetic head constructed in accordance with the invention, these figures showing particularly the gap region of the head. In FIGURES 4 and 5, a magnetic tape 38 is shown passing over the gap region of the head with the tape in contact with the outer surface of the core at the gap region. A current carrying conductor 40 is cemented or otherwise suitably secured to the inner surface of the core. This conductor 40 is a wire. The cement used may be any organic, hard drying cement. The conductor 40 is therefore securely held to the core 42 by means of the cement 41 or the like. When a direct current is passed through the conductor 40 as by means similar to those shown in FIGURE 1, a magnetic field is established around the conductor which extends into the core 42. It will be desirable for a strip 43 of a magnetic material having somewhat the same or higher permeability than the material used for the core 10 to be placed under the conductor 40. This strip 43 may be cemented to the core 42 and provides a magnetic flux path, for flux established by the conductor 40, which passes below the conductor. This is in order to prevent the flux established around the conductor from passing completely around the core and possibly decreasing the permeability of the entire core. With the construction shown in FIGURE 4, the cost of manufacturing a magnetic head is still further reduced. This is obvious from the fact that no openings need be made in the magnetic core structure 42. A virtual gap is formed between the inner and outer surfaces adjacent the conductor 40 by reason of the saturation of the core due to current carried by the conductor 40. The head shown in FIGURES 4 and 5 may be operated in the same manner as the head shown in FIGURE 1.

Figure 6:
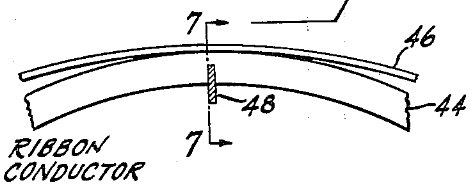
FIGURE 6 is a fragmentary front view of a magnetic head constructed in accordance with still another embodiment of the invention.
Figure 7:
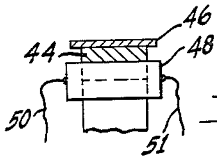
FIGURE 7 is a cross-sectional view taken along the line 7—7 of FIGURE 6.

FIGURES 6 and 7 are views of the gap region of still another magnetic head constructed in accordance with the invention. The outer surface of a core of magnetic material 44 is in contact with the magnetic tape 46. The inner surface of the core has a rectangular slot cut therein. A ribbon core 48 may be inserted into this slot. It may be mentioned that, if the material used for the core 44 is a ferrite, it will be unnecessary to apply an insulating coating, such as enamel, over the surface of the conductor 48. This is because the ferrite material has higher electrical resistivity than the conductor. It will be appreciated that the cross-sectional shape of the current carrying conductor determines the magnetic field established around the conductor due to current passing therethrough. In the instant case, the magnetic field will be more concentrated between the upper edge of the conductor and the outer surface of the core than elsewhere. Thus, a well defined virtual gap of small configuration is formed in the region of the core 44 adjacent the area of the contact of the core with the tape 46. Usual wire conductors 50 and 51 may be soldered to the ends of the ribbon conductor 48 to facilitate connection to other apparatus, such as a potentiometer and battery similar to those shown in FIGURE 1. In other respects, the magnetic head shown in FIGURES 6 and 7 may be operated in a manner similar to the magnetic head shown in FIGURE 1.

Figure 8:
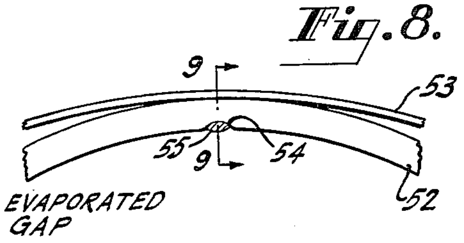
FIGURE 8 is a fragmentary front view of a magnetic head constructed in accordance with still another embodiment of the invention.
Figure 9:
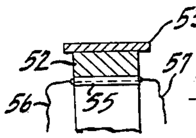
FIGURE 9 is a cross-sectional view taken along the line 9—9 of FIGURE 8.

FIGURES 8 and 9 show fragmentary views of the gap region of a magnetic head constructed in accordance with still another embodiment of the invention. This magnetic head has a core 52 of magnetic material, such as a ferrite. The outer surface of the core is adapted to contact the magnetic record tape 53. A recess 54 is formed in the inner surface of the core 52. Conductive material 55 is deposited, as by evaporation, in the recess 54 to define a conductive path for current therethrough. This current path is transverse to the path of travel of the magnetic tape 53. The material 55 may be evaporated in the recess in accordance with conventional techniques, such as are described in "Vacuum Deposition of Thin Films" by L. Holland. The magnetic heads shown in FIGURES 8 and 9 thus present still another convenient method of manufacturing a magnetic head having a virtual gap. It will be appreciated that the current may be applied through the conductive material 55 by way of leads 56 and 57 which may be soldered thereto.

Figure 10:
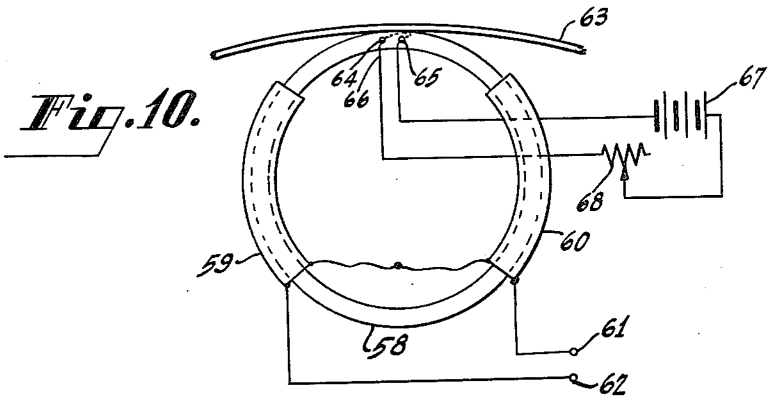
FIGURE 10 is a front view of a magnetic head constructed in acordance with still another embodiment of the invention.

A magnetic head having a virtual gap provided in accordance with still another embodiment of the present invention is shown in FIGURE 10. This magnetic head includes a core 58 of magnetic material having coils 59 and 60 wound thereon. These coils are connected together in hum bucking relationship and between a pair of terminals 61 and 62. A magnetic tape record 63 passes over the outer surface of the core and through a virtual gap region therein.

This virtual gap region is defined between a pair of apertures 64 and 65 through the core. The apertures extend in a direction transverse to the direction of motion of the tape 63. A current carrying conductor 66 is threaded through these apertures 64 and 65. While a single conductor is shown, it will be appreciated that two different conductors may be used. In the event that a single conductor threaded through the holes 64 and 65, as shown, is used, this conductor 66 may be connected in series with a source of direct current, illustratively shown as a battery 67 and a potentiometer 68. The potentiometer 68 adjusts the magnitude of direct current from the battery passing through the conductor 66. In operation, a virtual gap is defined between the apertures 64 and 65 by the action of the magnetic field established around the portions of the conductor 66 within the apertures 64 and 65. Since the current carrying conductor 66 reverses direction and passes through the hole 65, the sense of the magnetic field established around the hole 65 is opposite to the sense of the magnetic field around the hole 64. Accordingly, for a given current through the conductor, the flux density in the region between the holes 64 and 65 is greater than it would be in the magnetic field around a single conductor. Since a virtual gap is formed by the saturation of the magnetic material in the gap region, it will be appreciated that a virtual gap is provided in accordance with the twin conductor arrangement shown in FIGURE 10 with less current from the battery 67 than when a single conductor is employed, as illustrated in FIGURE 1. Moreover, this virtual gap may be more accurately defined.

Signals to be recorded may be applied, together with either alternating or direct current bias, if desired, across the terminals 61 and 62. The signals will establish a magnetic flux alternating within the core, which flux will define a recording field around the virtual gap. This recording field affects the tape 63 to record signals thereon. During playback, the magnetic flux recorded on the tape will pass into the core around the virtual signal gap defined by the conductor 66 and produce, in the coils 59 and 60, signals which appear across the output terminals 61 and 62.

Figure 11:
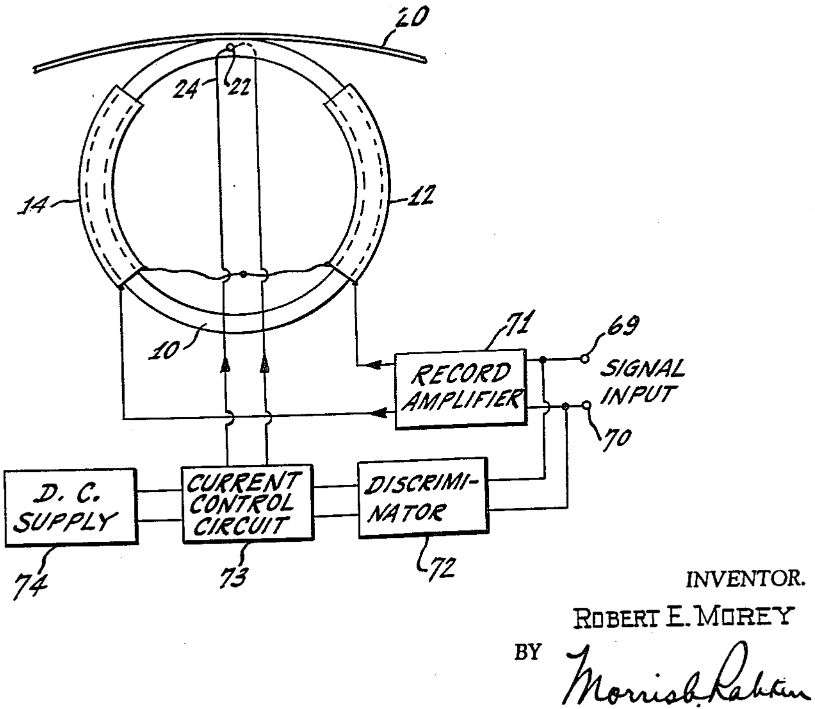
FIGURE 11 is a block diagram of a system for operating a magnetic head of the type shown in FIGURE 1 to obtain a controlled virtual signal gap.

FIGURE 11 shows a system for operating a magnetic head of the type shown in FIGURE 1 in order to continuously vary the character of the virtual signal gap. In particular, the system shown in FIGURE 11 is adapted to change the size of the gap in accordance with the frequency of signals to be recorded. It is a well recognized principle that a recording field will be of greatest amplitude if the gap which establishes the field increases and decreases with the wavelength of the signal to be recorded on the tape. The system shown in FIGURE 11 is adapted to vary the size of the virtual gap in order to obtain a gap of increased size for low frequency, long wavelength signals, and a gap of reduced size for high frequency, short wavelength signals. The magnetic head structure itself is similar to the structure shown in FIGURE 11, and like reference numerals will indicate like parts therein.

Signals to be recorded on the tape are applied to signal input terminals 69 and 70. These signals are amplified in a record amplifier 71 which may have a response characteristic for equalization. The amplified signals from the amplifier 71 are passed through the coils 12 and 14 to establish a recording flux field within the core 10. The signals from the signal input terminals 69 and 70 are also applied to a frequency discriminator 72. This discriminator 72 may merely be a rectifier which provides a direct current error signal varying in magnitude in accordance with the frequency of the signals applied to the signal input terminals 69 and 70. As the frequency of the signals increases, the error signal voltage will increase. Conversely, decreased signal frequency results in decreased error signal voltage. A current control circuit 73, which may be a conventional, variable gain amplifier, is connected to the discriminator. A direct current supply 74 operates the current control circuit 73. The output of the current control circuit is connected across the conductor 24 in order to control the current therethrough. This may be accomplished by connecting the conductor 24 in the plate circuit of the output tube in the current control circuit. The current through the tube will be controlled by the error signal voltages from the discriminator 72. Accordingly, the current through the conductor 24 will be adjusted in accordance with the frequency of the signal applied to the terminals 69 and 70. The current through the conductor 24 will increase from a given value when the frequency of the signal decreases from a given center frequency. The current through the conductor 24 will decrease when the signal applied to the terminals 69 and 70 increases in frequency from the center frequency. Since the magnitude of the current in the conductor 24 is related to the size of the virtual gap defined adjacent to the tape 20, the virtual gap will vary in size in accordance with the frequency of the signal applied to the terminals 69 and 70. In this manner, signals may be recorded on the tape with maximum amplitude throughout the frequency range thereof.

From the foregoing description, it will be apparent that I have provided an improved magnetic head which can be fabricated easily and which, by reason of its virtual gap, is free from the disadvantages of heretofore known magnetic heads. Moreover, since the virtual gap is an extremely narrow one, a head embodying the present invention will afford faithful signal translation even at high frequencies. Furthermore, the gap of my improved magnetic head can be made readily adjustable to readily accommodate it to a wide range of frequencies, as well as to effect compensation for wear. In addition, it will be noted that heads constructed as herein described will not only have a longer life than previously known heads, but will also produce less wear on the magnetic records with which they are used. This results from the fact that the core is continuous and has no breaks therein, as in conventional heads known heretofore. Other advantages of the present invention, as well as other forms and variations thereof within the spirit of this invention will, no doubt, suggest themselves to those skilled in the art. Hence, I desire that the foregoing shall be taken merely as illustrative of my invention and not in a limiting sense.

What is claimed is:

1. A magnetic head comprising a core of magnetic material, a signal coil magnetically coupled to said core, and a current carrying element associated with said core for magnetically saturating said core in the region of said element to thereby establish a virtual gap in said core at said region.

2. A magnetic head for cooperation with a magnetic record comprising a body of magnetic material defining a flux path continuous within said material in a region adjacent said magnetic record, and means for passing through said body in said region an electric current of such magnitude that the magnetic field set up thereby in said region will saturate said region magnetically to thereby establish a virtual signal gap therein.

3. A magnetic head for cooperation with a magnetic record movable with respect to said head along a prescribed path, said head comprising a core of magnetic material presenting a continuous surface of magnetic material adjacent said path, and means for establishing a saturating magnetic field within said core in a region adjacent to said surface to thereby provide a virtual signal gap in said core at said region.

4. A magnetic head for cooperation with a magnetic record movable with respect to said head along a prescribed path, said head comprising a magnetic core presenting a continuous, integral surface to said record along said path, and means for establishing a state of magnetic saturation within said core along said surface adjacent said path whereby to provide a virtual signal gap in said core, said last-named means including a conductor for carrying an electrical current.

5. The invention as claimed in claim 4 wherein said conductor is disposed in a direction transverse to said path.

6. In combination, a magnetic head which comprises a core of magnetic material having a continuous surface for cooperation with a magnetic record, a conductor disposed transversely across said core, and means for energizing said conductor so as to saturate said core in the region thereof between said conductor and said continuous surface to establish a virtual signal gap in said core adjacent to said conductor.

7. A magnetic head for cooperation with a magnetic record movable with respect to said head along a prescribed path, said head comprising a core of magnetic material having a continuous surface along said path and another surface opposite thereto, a conductor spaced from said path and disposed only on said other surface in a direction transverse to said path, and means for passing direct current through said conductor for saturating said core in the region thereof between said continuous surface and said conductor for establishing a virtual signal gap in said core.

8. A magnetic head for cooperation with a magnetic record movable with respect to said head along a prescribed path, said head comprising a core of magnetic material having a continuous surface along said path and another surface opposite thereto, said core also having a hole therethrough between said surfaces, a conductor extending through said hole, and means for saturating said core at the portion thereof between said conductor and said continuous surface for establishing a virtual signal gap in said core.

9. A magnetic head for cooperation with a magnetic record movable with respect to said head along a prescribed path, said head comprising a core of magnetic material having a continuous surface along said path and another surface opposite thereto, said core having a recess in said other surface, a conductor in said recess and means for saturating said core at the portion thereof between said conductor and said continuous surface for establishing a virtual signal gap in said core.

10. A magnetic head according to claim 9 wherein said conductor is evaporated into said recess.

11. A magnetic head for cooperation with a magnetic record movable with respect to said head along a prescribed path, said head comprising a core of magnetic material having a continuous surface along said path and another surface opposite thereto, said core having a rectangular slot extending thereinto from said other surface toward said continuous surface, a ribbon conductor disposed in said slot, and means for saturating said core at the portion thereof between said conductor and said continuous surface for establishing a virtual signal gap in said core.

12. A magnetic head for cooperation with a magnetic record movable with respect to said head along a prescribed path which comprises a core of magnetic material having a continuous surface along said path and another surface opposite thereto, a conductor disposed only on said other surface and extending in a direction transversely across said prescribed path, and means for saturating said core at the portion thereof between said conductor and said continuous surface for establishing a virtual signal gap in said core.

13. The invention as set forth in claim 12 including a strip of magnetic material attached to said other surface and bridging said conductor.

14. A magnetic head for cooperation with a magnetic record movable with respect to said head along a prescribed path, said head comprising a core of magnetic material presenting a continuous path for magnetic flux within said core adjacent said record, a signal coil around said core, said flux path extending through said coil, and a current carrying element disposed across said core for driving said core to magnetic saturation in a region immediately adjacent said record path for establishing a virtual signal gap in said region.

15. A magnetic head for cooperation with a magnetic record movable with respect to said head along a prescribed path, said head comprising a loop of ferrite material presenting a continuous path for magnetic flux around said loop adjacent said magnetic record, a signal coil around said loop and linking said magnetic flux, a conductor disposed across said loop for driving said loop to magnetic saturation in a region immediately adjacent said record to establish a virtual signal gap in said region, a container of non-conductive material for said loop, and a shield of conductive non-magnetic material around said container.

16. In combination, a magnetic head comprising a core of magnetic material, a conductor across said core for establishing a saturating magnetic field in said core at a certain region thereof to thereby establish a virtual gap therein, a signal coil around said core, means for applying to said coil a signal to be recorded, a source of direct current, means responsive to said signal for providing a control signal varying in accordance with the frequency of said signal to be recorded, and means coupling said source to said conductor responsive to said control voltage for varying the magnitude of the current applied to said conductor in accordance therewith.

17. A magnetic head comprising a core of magnetic material presenting a continuous surface of magnetic material at a certain region thereof for cooperation with a magnetic record, and a plurality of current carrying elements adapted to carry direct current disposed across said core and spaced from said surface, said elements being adapted to carry direct current of a magnitude sufficient to cause magnetic saturation of said core at said region to thereby define a virtual gap in said core at said region between said elements and said continuous surface.

18. A magnetic head for cooperation with a magnetic record comprising a core of magnetic material having a continuous surface engageable with said record, a pair of conductors each extending across said core and spaced from each other and from said continuous surface, and means for passing direct current in opposite directions through the respective ones of said conductors to magnetically saturate said core in the region of said record engageable surface thereof to thereby establish a virtual gap in said core at the portion thereof between said conductors and said continuous surface.

References Cited in the file of this patent

UNITED STATES PATENTS

| | | |
|---|---|---|
| 2,351,011 | Camras | June 13, 1944 |
| 2,418,542 | Camras | Apr. 8, 1947 |
| 2,509,780 | O'Dea | May 30, 1950 |
| 2,590,292 | Anderson | Mar. 25, 1952 |
| 2,677,019 | Buhrendorf | Apr. 27, 1954 |
| 2,756,280 | Rettinger | July 24, 1956 |
| 2,861,135 | Rettinger | Nov. 18, 1958 |
| 2,879,340 | Starr | Mar. 24, 1959 |
| 2,905,770 | Kornei | Sept. 22, 1959 |
| 2,915,597 | Wanlass et al. | Dec. 1, 1959 |
| 2,927,973 | De Geller | Mar. 8, 1960 |
| 2,933,721 | Hagopian | Apr. 19, 1960 |
| 3,004,820 | Howden | Oct. 17, 1961 |
| 3,016,427 | Grant | Jan. 9, 1962 |

FOREIGN PATENTS

| | | |
|---|---|---|
| 895,063 | Germany | Oct. 29, 1953 |
| 770,127 | Great Britain | Mar. 13, 1957 |

OTHER REFERENCES

Some Aspects of Magnetic Recording, Barrett and Tweed; J. Inst. Elec. Engers. (London), vol. 82, (March 1938), pp. 265–288 (only page 274 is needed); TK 1. I 4.